United States Patent Office 3,124,447
Patented Mar. 10, 1964

3,124,447
METHOD OF CONTROLLING VEGETATION
Robert J. Wineman, Concord, Mass., and Gino J. Marco, Webster Groves, Mo., assignors to Monsanto Chemical Company, St. Louis, Mo., a corporation of Delaware
No Drawing. Filed Aug. 10, 1959, Ser. No. 832,494
18 Claims. (Cl. 71—2.3)

This invention relates generally to the destruction of plants and the selective control and inhibition of plant growth. More particularly, it relates to herbicidal methods and compositions in which nitroaryl sulfur compounds are essential active ingredients.

Weeds may be broadly defined as undesirable plant growth. In certain places, e.g. along railroad rights of way, any vegetation thereon is considered a weed and complete prevention of the growth of all plants is desired. Of even greater importance is the selective control of weeds in agriculture, i.e. retardation of growth or extermination of weeds without injury to the crop. For example, grass or other plants growing within a corn field are regarded as weeds and are difficult to remove or prevent. Non-selective herbicides which are chemicals that destroy and/or inhibit plant life in general without regard to species, are fairly abundant. Selective herbicides, i.e. those chemicals which may be used to control specific undesirable plants without serious damage to desirable species growing in the same area, are not generally available. Some chemicals possess non-selective properties when applied in relatively high rates, i.e. about 25 pounds per acre or more, and yet are selective when applied at much lower rates. Chemicals which possess these non-selective properties when applied at high rates to vegetation or soil and selective properties when applied to the soil at lower rates, are rare indeed. The cost of chemical materials for treating the soil or vegetation, which cost embraces both the price per pound and the quantity required is obviously an important factor in commercial utilization of herbicidal chemicals. Moreover, the selectivity of a chemical must be considered not only with respect to the soil to which it is applied but also to the effect of the chemical on adjacent fields containing crops which are sensitive to this chemical. For these reasons the problem of finding a herbicide which possesses a high proportion of these attributes is an exceedingly difficult one.

Accordingly, it is a primary object of this invention to provide a new and useful class of general herbicides and methods for their use.

A further object of this invention is to provide a method of inhibiting the germination and growth of grasses in the presence of certain broadleaf plants.

A further object of this invention is to provide a method of inhibiting the germination and growth of grasses in the presence of other narrowleaf plants, such as corn.

Other objects and advantages of the present invention will be apparent from the following description.

In accordance with this invention, it has been discovered that compounds of the following chemical structure possess unusual and valuable herbicidal activity:

R—X—R′ wherein R is a nitrophenyl radical; X is a sulfide (—S—), sulfoxide

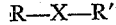

or sulfone

function and R′ is an aliphatic radical having from 1 to 5 carbon atoms in an unbroken chain. The term aliphatic radical is meant to include saturated and unsaturated aliphatic radicals and includes alkyl, alkenyl, alkynyl, alkoxyalkyl, alkylthioalkyl radicals and the like. R is preferably nitrophenyl or substituted nitrophenyl such as 2-nitro-4-chlorophenyl, 2-nitro-3-bromophenyl and similar mono- and poly-halogenated nitrophenyls; 4-methoxy-2-nitrophenyl, 3,5 diethoxy-2-nitrophenyl, 4-butoxy-2-nitrophenyl and similar mono- and poly-ether substituted nitrophenyls; dimethylnitrophenyl, 4-butyl-2-nitrophenyl and similar mono- and poly-alkylated nitrophenyls; mercaptonitrophenyl and lower alkylmercapto nitrophenyl, e.g. 4-ethylmercapto-2-nitrophenyl, 4 nitro-2-methylmercaptonitrophenyl, etc.; and similar commonly substituted nitrophenyl radicals.

As exemplary of the radicals which come within the scope of the term R′, the alkyl radicals may be methyl, ethyl, n-propyl, isopropyl, t-butyl, n-butyl, isobutyl, isoamyl, etc.; or halogen or nitro-substituted alkyl radicals such as chloromethyl, 2-chloroethyl, 2,2-dichloroethyl, 2-bromoethyl, 2-iodoethyl, 3-fluoropropyl, 2-nitroethyl, 4-nitrobutyl, etc.; the alkenyl radicals may be vinyl, allyl, methallyl, 2-butenyl, n-pentenyl, etc.; or halogen or nitro-substituted alkenyl radicals such as 2-chloroallyl, 2,3-dichloroallyl, 4-bromo-2-butenyl, 3-nitroallyl, 4-nitro-3-butenyl, etc.; the alkynyl radicals may be propargyl, 3-butenyl, 2-pentynyl, etc. or halogen or nitro-substituted alkynyl radicals such as 2-chloropropargyl, 3-bromopropargyl, 4-chloromethyl propargyl, etc.; the alkoxyalkyl radicals may be methoxyethyl, ethoxymethyl, propoxyethyl, ethoxy, ethoxy-n-pentyl, isobutoxyethyl, etc.; the alkyl thioalkyl radicals may be methylthioethyl, ethylthiomethyl, isopropylthioethyl, n-butylthiomethyl, isopentynthiopropyl, sec.-hexylthioethyl, methylthio-sec.-pentyl, ethylthioisobutyl, etc.

As illustrative of the compounds which come within the scope of this invention, there may be mentioned:

Ethyl-2′-nitrophenyl sulfide
Methyl-2′-nitrophenyl sulfide
Ethyl-4′-nitrophenyl sulfide
Ethyl-2′-nitrophenyl sulfone
Ethyl-2′-nitrophenyl sulfoxide
Isopropyl-2′-nitrophenyl sulfide
Sec.-butyl-2′-nitrophenyl sulfide
Allyl-2′-nitrophenyl sulfide
2-butenyl-2′-nitrophenyl sulfide
Propargyl-2′-nitrophenyl sulfide
n-Pentyl-3′-nitrophenyl sulfide
2-chloroallyl-2′-nitrophenyl sulfide
2-chloropropargyl-2′-nitrophenyl sulfide
Ethylthiomethyl-2′-nitrophenyl sulfide
Ethoxymethyl-2′-nitrophenyl sulfide
Methoxyethyl-4′-nitrophenyl sulfide
Isopropylthiopropyl-2′-nitrophenyl sulfide
Ethylthioethyl-2′-nitrophenyl sulfone
Ethylthioethyl-2′-nitrophenyl sulfoxide
Methoxymethyl-2′-nitrophenyl sulfide
2-nitroethyl-2′-nitrophenyl sulfide
2-chloroethyl-2′-nitrophenyl sulfide
3-bromopropyl-2′-nitrophenyl sulfide 2,3-dichloropropyl-2'-nitrophenyl sulfone
Isobutyl-2'-nitrophenyl sulfone
2-chloroallyl-2'-nitrophenyl sulfone
Isopropenyl-2'-nitrophenyl sulfone
Ethoxyethyl-3'-nitrophenyl sulfone
Ethylthiomethyl-3'-nitrophenyl sulfone
Ethyl-4'-chloro-2'-nitrophenyl sulfone
Propargyl-nitroxylyl sulfide
Methoxyethyl-4'-ethoxy-2'-nitrophenyl sulfide
Ethylthiomethyl-4'-chloro-2'-nitrophenyl sulfoxide
Methyl-3',5'-dimethoxy-2'-nitrophenyl sulfide
2,3-dichloroallyl-4'-chloro-2'-nitrophenyl sulfone
Ethyl-4'-mercapto-2'-nitrophenyl sulfide
Ethyl-4'-methylmercapto-2'-nitrophenyl sulfide Included within the above broad class of compounds useful in the compositions and methods of this invention is a class of compounds which possess outstanding pre-emergence herbicidal activity:

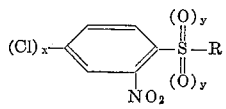

wherein R is an aliphatic radical having from one to four carbon atoms, X is zero or one and Y is zero or one. Thus, when X is zero, then a hydrogen atom is attached to the aromatic ring. The compounds in which R is an alkyl radical having from one to four carbon atoms are even more preferred.

The nitroaryl sulfur compounds of this invention may be prepared by numerous methods known to those skilled in the art of chemical synthesis, and are disclosed and discussed in prior patents and in the literature. For example, the ortho- and para-nitrophenyl thioethers can be prepared by reacting the corresponding chloronitrobenzene compounds with an alkali metal mercaptide. All of the isomers may be prepared by reacting the appropriate alkali metal nitrothiophenate with the desired organic halide (see the article by W. R. Waldron et al., JACS 45, 2399 (1923) and the article by D. G. Foster et al., JACS 46, 1936 (1924)). Another method involves the reaction of diazotized nitroanilines with the desired alkali metal mercaptides.

Still another method which is especially useful for obtaining the haloaliphatic derivatives involves the reaction of nitrosulfenyl halides, preferably the chloride, with unsaturated aliphatic hydrocarbons (see for example the article by W. L. Orr et al., JACS 75, 6030 (1953) and the article by N. Kharasch et al., JACS, 75, 1081 (1953)).

The active compound is, of course, applied in an amount sufficient to exert the desired herbicidal action. The amount of active compound present in the compositions as actually applied for destroying or preventing weeds, i.e., unwanted plants, will vary with the manner of application, the particular weeds for which the control is sought, the purpose for which the application is being made, and like variables. In general, the herbicidal compositions as applied will contain from about 1% to about 75% by weight of the active ingredient.

Valuable herbicidal effects will be observed by application of small amounts, for example as low as one-half pound of active compound per acre, as well as large amounts, e.g. 100 pounds per acre. For general application and herbicidal effect on both grasses and dicotyledonous plants in either pre-emergence or contact methods, it is advantageous to use amounts in the range of from about 10 to about 50 pounds per acre. As a general rule, the selective activity is exhibited at lower rates of application.

The herbicidal compositions of this invention are prepared by admixing one or more of the nitroaryl sulfur compounds, defined heretofore, in herbicidally effective amounts with a conditioning agent, of the kind used and referred to in the art as a pest control adjuvant or modifier, to provide formulations adapted for ready and efficient application to soil or weeds (i.e. undesired plants) using conventional applicator equipment.

Thus, the herbicidal compositions or formulations are prepared in the form of solids or liquids. Solid compositions are preferably in the form of dusts and are compounded to give homogeneous, free-flowing dusts by admixing the compound or compounds with finely-divided solids, preferably talcs, clay, lime, bentonite, pumice, fuller's earth, pyrophyllite, diatomaceous earth, or flours such as walnut shell, wheat, redwood, soya bean, cottonseed flours, and other inert solid conditioning agents or carriers of the kind conventionally employed in preparing pest control compositions in dusts or powdered form. These diluents may represent a substantial proportion, for example, 50 to 98 percent by weight of the entire formulation as applied.

Liquid compositions of the invention are prepared in the usual way by admixing one or more of the nitroaryl sulfur compounds with suitable liquid diluent media. With certain solvents, such as alkylated naphthalene, methyl isobutyl ketone, methyl ethyl ketone, dimethyl formamide, kerosene and cresol, high concentrations of the active ingredient can be obtained in solution. The proportions of such organic liquid additive will depend upon the solubility properties of the active ingredient and may require as little as one percent or as much as 90 percent or more in order to provide a uniformly distributed formulation.

The herbicidal compositions of the invention, whether in the form of dusts or liquids, preferably include also a surface-active agent of the kind sometimes referred to in the art as wetting, dispersing, or emulsifying agents. These agents, which will be referred to hereinafter as surface-active agents, cause the compositions to be easily dispersed in water to give aqueous sprays which, for the most part, constitute desirable compositions for application.

The surface-active agents employed can be of the anionic, cationic, or nonionic type and include, for example, sodium and potassium oleate, the amine salts of oleic acid such as morpholine and dimethylamine oleates, the sulfonated animal and vegetable oils such as sulfonated fish and castor oils, sulfonated petroleum oils, sulfonated acyclic hydrocarbons; sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate sorbitol laurate, pentaerythritol monostearate, glycerol monostearate, diglycol monostearate, diglycol oleate, polyethylene oxides, ethylene oxide condensation products with stearyl alcohol and octyl phenol, polyvinyl alcohols, salts, such as the acetate of polyamines from the reductive amination of ethylene/carbon monoxide polymers, laurylamine hydrochloride, laurylpyridinium bromide, stearyltrimethylammonium bromide, cetyldimethylbenzyl ammonium chloride, lauryl dimethylamine oxide and the like. Generally, the surface-active agents will be only a minor portion of the formulation as used, for example, less than 15 percent and frequently as low as 0.05 percent by weight of the composition. Usually, concentrations of from 0.5 to 5 percent are found to be optimum.

The herbicidal compositions are applied either as a spray or a dust to the locus or area to be protected from undesirable plant growth, commonly called weeds, i.e., plants growing where they are not wanted. Such application can be made directly upon the locus or area and the weeds thereon during the period of infestation in order to destroy existing undesirable plant growth, but preferably the application is made in advance of an anticipated weed infestation to prevent such infestation. Thus, the composition can be applied as foliar sprays and also as sprays directly to the surface of the soil. Alternatively, the dry powdered compositions can be dusted directly on the plants or dispersed in the surface soil.

The phrase "applying to the soil" as used herein in the specification and claims shall be understood to refer to any method of applying the active ingredient to the soil for pre-emergence control and includes spraying a cultivated field, injecting a liquid formulation in a furrow by means of a suitable jet following a plow or harrowing device, dusting a field with a solid formulation before the field is plowed or any other suitable means whereby substantial uniform distribution of the pesticidal agents can be effected.

Both the solid and the liquid formulations described herein are useful in the application of the herbicides, because they facilitate the uniform distribution and aid in the control of undesirable plants by maintaining the active ingredient in a form which enables its prompt assimilation by the plant and the efficient utilization of its weed destroying properties. The described agents enable the proper use to achieve the desired herbicidal effect by an unskilled operator without elaborate equipment.

Fertilizer materials, other herbicidal and other pest control agents, such as fungicides and insecticides, can be included in the herbicidal compositions of the invention if desired.

The present invention is illustrated, but not limited, by the following examples in which the term "parts" means parts by weight.

EXAMPLE I

Post Emergence or Foliage Test

Seeds of the following plants: cotton, corn, radish, wild buckwheat, sugar beet, wild oat, crab grass, rye grass, and Field bindweed, are planted in soil in aluminum pans (9½" x 5¼" x 2¾"). A good grade of top soil, which has been treated with 0.05% Krilium (trademark of Monsanto Chemical Company) soil conditioner and screened through a ½ inch wire mesh, is compacted to a depth of ⅜" from the top. The grass seeds are scattered randomly over one-half of the soil surface and the broadleaf seeds are scattered randomly over the remaining soil surface. The seeds are covered with ⅜" of the prepared soil mixture and the pan leveled.

An aqueous emulsion of the test compound is prepared by first dissolving 0.5 gm. in 20 cc. of acetone. To 2.75 cc. of this stock solution there is added 0.2 cc. of a 3:1 cyclohexanone-emulsifier "L" (65% tall oil-ethylene oxide condensate-35% butylamine dodecylbenzene sulfonate) mix and the resulting solution is diluted to a volume of 11 cc. with water. A single aluminum pan is sprayed with 6 cc. of this solution, which contains 0.5% by weight of the test compound. This amount of chemical for the test area corresponds to a rate of approximately 9 pounds per acre.

After 21 days the plants are sprayed with an aqueous emulsion of the particular test compound.

Throughout the course of the tests, the boxes are watered whenever necessary. Good growth conditions are maintained during the test period. The tests are terminated 14 days after the spraying and the results are observed and recorded.

The relative value of each compound with respect to its herbicidal effect on broadleaf plants and grasses is indicated by a number as follows:

| | |
|---|---|
| 0 | No phytotoxicity. |
| 1 | Slight. |
| 2 | Moderate. |
| 3 | Severe. |
| 4 | Dead. |

In the following table of herbicidal evaluation data the plants are represented by letters as follows:

A—Wild oat  
B—Rye  
C—Buckwheat  
D—Radish  
E—Sugar beet  
F—Cotton  
G—Corn  
H—Crabgrass  
I—Field Bindweed The following table of observed data demonstrates the phytotoxicity of the compounds tested:

| Compound | Rate, lbs./acre | A | B | C | D | E | F | G | H | I |
|---|---|---|---|---|---|---|---|---|---|---|
| Methyl-2'-nitrophenyl sulfide. | 9 | 3 | 2 | 4 | 4 | 4 | 4 | 4 | 4 | 4 |
| | 3.6 | 2 | 1 | 2 | 4 | 4 | 4 | 3 | 3 | 4 |
| | 0.9 | 1 | 1 | 2 | 4 | 4 | 3 | 1 | 1 | 3 |
| Ethyl-2'-nitrophenyl sulfide. | 9 | 2 | 2 | 3 | 4 | 0 | 3 | 3 | 1 | 4 |
| | 3.6 | 1 | 1 | 2 | 4 | 0 | 3 | 3 | 1 | 3 |
| | 0.9 | 1 | 0 | 1 | 2 | 0 | 3 | 2 | 1 | 2 |
| Propyl-2'-nitrophenyl sulfide | 9 | 1 | 2 | 2 | 4 | 0 | 2 | 2 | 3 | 2 |
| Allyl-2'-nitrophenyl sulfide | 9 | 4 | 2 | 4 | 4 | 4 | 4 | 4 | 4 | 2 |
| Ethyl-2'-nitrophenyl sulfone. | 9 | 4 | 4 | 4 | 4 | 4 | 4 | 4 | 4 | 4 |
| | 3.6 | 3 | 3 | 4 | 4 | 4 | 4 | 3 | 3 | 4 |
| | 0.9 | 2 | 2 | 2 | 3 | 3 | 3 | 3 | 3 | 3 |
| 2-chloroethyl-2'-nitrophenyl sulfide. | 9 | 3 | 3 | 3 | 4 | 4 | 4 | 4 | 3 | 4 |
| | 3.6 | 1 | 2 | 1 | 2 | 2 | 2 | 2 | 3 | 2 |
| 1-propyl-2'-nitrophenyl sulfone | 9 | 3 | 3 | 3 | 3 | 3 | 3 | 3 | 3 | 3 |
| 2-methoxyethyl-2'-nitrophenyl sulfide | 9 | 4 | 4 | 4 | 3 | 3 | 3 | 4 | 4 | 3 |
| Methyl-thiomethyl-2'-nitrophenyl sulfide | 9 | 2 | 2 | 2 | 3 | 3 | 3 | 2 | 2 | 3 |

The herbicidal activity of the above compounds is surprising, for related compounds possess little or no herbicidal activity. The results obtained with some of the compounds tested, as above (at 9 lbs./acre level), are set forth below:

| | Grass | Broad |
|---|---|---|
| 2-(2'-nitrophenylthio)ethyl amine | 0 | 0 |
| 2'-nitrophenyl-ar,ar,ar-trichlorobenzyl sulfide | 0 | 0 |
| Phenyl-2'-nitrophenyl sulfide | 1 | 1 |
| Ethyl-2'-anilino sulfide | 1 | 1 |
| 3-(2'-nitrophenylthio)-1,2-propylene oxide | 1 | 1 |
| Ethyl-2'-nitrophenyl oxide | 0 | 1 |
| Ethyl-3'-nitrophenyl oxide | 0 | 1 |
| Bis(3'-nitrophenyl) disulfide | 0 | 0 |
| Bis(4'-nitrophenyl) disulfide | 0 | 0 |
| 4'-nitrobenzene sulfenyl chloride | 0 | 0 |
| Ethyl-4'-nitrobenzene sulfonate | 1 | 1 |
| 4'-nitrophenyl-ar,ar,ar-trichlorobenzyl sulfide | 0 | 1 |
| Bis(4'-nitrophenyl)sulfide | 0 | 0 |
| Cyclohexyl-2'-nitrophenyl sulfide | 0 | 0 |
| β-Napthyl-2'-nitrophenyl sulfide | 0 | 0 |
| α-Furfuryl-2'-nitrophenyl sulfide | 0 | 0 |
| n-Hexyl-2'-nitrophenyl sulfide | 0 | 0 |
| p-Tolyl-2'-nitrophenyl sulfide | 0 | 0 |

EXAMPLE II

Pre-Emergence Test

The relative value of several of the nitroaryl sulfur compounds as pre-emergence herbicides is exemplified by planting in aluminum pans (9½" x 5¼" x 2¾"), seeds of fourteen different plants each representing a principal botanical type. A good grade of top soil which has been treated with 0.05% Krilium (trademark of Monsanto Chemical Company) soil conditioner and screened through ½ inch wire mesh, is compacted to a depth of ⅜" from the top of the pan. The grass seeds are scattered randomly over one-half of the soil surface and the broadleaf seeds are scattered randomly over the remaining soil surface. The seeds are covered with ⅜" of the prepared soil mixture and the pan leveled.

An aqueous emulsion of the test compound is prepared by first dissolving 0.5 gm. in 25 cc. of acetone. Ten cc. of this stock solution is pipetted into the atomizer vial and 0.2 cc. of a 3:1 cyclohexanone emulsifier "L" (65% tall oil-ethylene oxide condensate-35% butylamine dodecylbenzene sulfonate) is added thereto. The resulting solution is then diluted to 15 cc. with water. Thus 15 cc. is then sprayed over the entire area of the pre-planted pan for the pre-emergence herbicide test. This amount of chemical for the test area corresponds to a rate of approximately 25 pounds per acre.

After spraying, the pans are placed in ½" of water and allowed to absorb moisture through the perforated bottom until the soil surface is about one-half moist.

The pans are then transferred to a wet sand bench in a greenhouse.

Fourteen days after application of the test chemical, the results are observed and recorded. The number of plants of each species which germinated and grow are counted and converted to a herbicidal rating by means of a fixed scale based on average percent germination. Germination rates are established for all new seed lots and periodic checks run on old seed in current use.

HERBICIDAL RATING—CONVERSION SCALE

| Percent Germination | 3 | 2 | 1 | 0 |
|---|---|---|---|---|
| 100 | 0–5 | 6–10 | 11–15 | 16–20 |
| 90 | 0–5 | 6–9 | 10–13 | 14–20 |
| 80 | 0–4 | 5–8 | 9–12 | 13–20 |
| 70 | 0–4 | 5–7 | 8–11 | 12–20 |
| 60 | 0–3 | 4–6 | 7–9 | 10–20 |
| 50 | 0–3 | 4–5 | 6–8 | 9–20 |
| 40 | 0–2 | 3–4 | 5–6 | 7–20 |
| Corn | 0–1 | 2 | 3 | 4–5 |

The relative value of each compound with respect to its herbicidal effect on each plant is indicated by a number as follows:

0 — No phytotoxicity.
1 — Slight.
2 — Moderate.
3 — Severe.

In the following table of herbicidal evaluation data the plants are represented by letters as follows:

| Code | Plant Name | Plant Family | Genus | Species |
|---|---|---|---|---|
| A | Morning Glory | Convolvulaceae | Ipomoea | hederacea. |
| B | Wild Oat | Gramineae | Avena | fatua. |
| C | Brome | do | Bromus | tectorum. |
| D | Rye grass | do | Lolium | perenne. |
| E | Wild Buckwheat | Polygonaceae | Polygonum | convolvulus. |
| F | Radish | Cruciferae | Raphanas | sativus. |
| G | Sugar Beet | Chenopodiaceae | Beta | vulgaris. |
| H | Cotton | Malvaceae | Gossypium | herbaceum. |
| I | Corn | Gramineae | Zea | maize. |
| J | Foxtail | do | Setaria | faberii. |
| K | Barnyard | do | Echincholoa | crusgalli. |
| L | Crab Grass | do | Digitaria | sanguinalis. |
| M | Field Bindweed | Convolvulaceae | Convolvulus | arvensis. |
| N | Pigweed | Amaranthaceae | Amaranthus | retroflexus. | activity. When tested as described above (25 lbs./per acre level), aqueous emulsions of a random group of such compounds are found to possess little or no pre-emergence herbicidal activity. Some of the compounds tested are set forth below:

o-Nitrobenzenethiol
Bis(2'-nitrophenyl)disulfide
2-(2'-nitrophenylthio) ethylamine
2'-nitrophenyl trichloromethyl disulfide
2'-nitrophenyl-ar,ar,ar-trichlorobenzyl sulfide
Bis(4'-nitrophenyl) disulfide
4'-nitrobenzene sulfenyl chloride
Ethyl-4'-nitrobenzene sulfonate
2',4'-dinitrobenzene sulfonate
N,N-dimethyl-2-(2'-nitrophenylthioethyl) amine
3'-nitrobenzene sulfonyl chloride
2'-ethylthioaniline
α Furfuryl-2'-nitrophenyl sulfide
β Naphthyl-2'-nitrophenyl sulfide
Cyclohexyl-2'-nitrophenyl sulfide
n-Hexyl-2'-nitrophenyl sulfide
p Tolyl-2'-nitrophenyl sulfide
p Chlorophenyl-2'-nitrophenyl sulfide EXAMPLE III
Dust Formulations The following compositions are adapted for direct application as dusts for the prevention of weeds using conventional applicator equipment. The dusts are mixed by blending or mixing the ingredients and grinding the mix to give compositions having an average particle size less than about 50 microns.

A | Parts
--- | ---
Ethyl-2'-nitrophenyl sulfide | 20
Bentonite | 80
 | 100

B | 
--- | ---
Ethyl-2'-nitrophenyl sulfone | 25
Talc | 75
 | 100

EXAMPLE IV
Water-Dispersible Powders

The following powdered compositions are adapted for

TABLE OF THE PRE-EMERGENCE DATA

| Compound | Rate, lbs./acre | A | B | C | D | E | F | G | H | I | J | K | L | M | N |
|---|---|---|---|---|---|---|---|---|---|---|---|---|---|---|---|
| methyl-2'-nitro-phenyl sulfide | 25 | 3 | 3 | 3 | 3 | 3 | 3 | 3 | 3 | 3 | 3 | 3 | 3 | 3 | 3 |
|  | 10 | 3 | 3 | 3 | 1 | 3 | 3 | 3 | 3 | 3 | 3 | 3 | 3 | 3 | 3 |
|  | 5 | 1 | 1 | 1 | 1 | 1 | 3 | 2 | 2 | 3 | 3 |  | 3 | 2 | 3 |
| Ethyl-2'-nitro-phenyl sulfide | 25 | 3 | 3 | 3 | 3 | 3 | 3 | 3 | 3 | 3 | 3 | 3 | 3 | 3 | 3 |
|  | 10 | 3 | 3 | 3 | 3 | 3 | 3 | 3 | 3 | 3 | 3 | 3 | 3 | 3 | 3 |
|  | 5 | 3 | 2 | 3 | 3 | 3 | 2 | 3 | 2 | 3 | 3 | 3 | 3 | 3 | 1 |
|  | 1 | 0 | 1 | 2 | 1 | 0 | 1 | 1 | 0 | 0 | 2 | 1 | 3 | 1 | 0 |
| Propyl-2'-nitro-phenyl sulfide | 25 | 2 | 3 | 3 | 3 | 2 | 3 | 3 | 3 | 1 | 3 | 3 | 3 | 3 | 3 |
|  | 10 | 1 | 1 | 3 | 1 | 0 | 3 | 3 | 1 | 2 | 0 | 2 | 3 | 3 | 3 |
|  | 3 | 0 | 1 | 2 | 2 | 1 | 3 | 2 | 0 | 0 | 2 | 2 | 3 | 0 | 0 |
| Ethyl-2'-nitro-phenyl sulfone | 25 | 3 | 3 | 3 | 3 | 1 | 2 | 3 | 2 | 0 | 2 | 2 | 3 | 3 | 3 |
|  | 10 | 2 | 2 | 2 | 3 | 1 | 2 | 2 | 1 | 1 | 2 | 3 | 3 |  | 3 |
|  | 5 | 0 | 1 | 2 | 3 | 0 | 2 | 1 | 0 | 0 | 2 | 3 | 3 | 1 | 3 |
| Allyl-2'-nitro-phenyl sulfide | 25 | 0 | 2 | 3 | 3 | 1 | 3 | 3 | 0 | 2 | 0 | 3 | 3 | 2 | 3 |
|  | 5 | 0 | 0 | 1 | 1 | 0 | 0 | 0 | 0 | 0 | 1 | 0 | 3 | 0 | 2 |
| 2-chloroallyl-2'-nitrophenyl sulfide | 25 | 0 | 1 | 2 | 2 | 0 | 0 | 1 | 0 | 0 | 1 | 3 | 3 | 0 | 3 |
|  | 10 | 0 | 2 | 2 | 1 | 0 | 1 | 2 | 0 | 0 | 2 | 3 | 3 | 0 | 3 |
|  | 5 | 0 | 1 | 3 | 0 | 0 | 0 | 2 | 0 | 1 | 3 | 3 | 3 | 0 | 3 |
| 2-chloroethyl-2'-nitrophenyl sulfide | 25 | 2 | 1 | 2 | 2 | 1 | 3 | 2 | 0 | 0 | 3 | 3 | 3 | 0 | 3 |
|  | 10 | 0 | 0 | 3 | 1 | 0 | 3 | 3 | 0 | 0 | 3 | 3 | 3 | 0 | 3 |
|  | 5 | 0 | 0 | 3 | 3 | 0 | 2 | 0 | 0 | 0 | 3 | 3 | 3 | 1 | 3 |
| Ethyl-4'-nitro-phenyl sulfide | 25 | 3 | 0 | 3 | 1 | 3 | 3 | 3 | 2 | 0 | 2 | 2 | 1 | 3 | 3 |
|  | 10 | 2 | 1 | 2 | 1 | 1 | 3 | 2 | 0 | 1 | 2 | 3 | .2 | 2 | 3 |
|  | 5 | 1 | 2 | 1 | 1 | 0 | 1 | 0 | 1 | 0 | 2 | 1 | 0 | 0 | 2 |
| Ethyl-3'-nitro-phenyl sulfide | 25 | 1 | 0 | 2 | 2 | 1 | 2 | 2 | 3 | 0 | 2 | 3 | 3 | 1 | 2 |
| Ethyl-4'-chloro-2'-nitrophenyl sulfone | 25 | 0 | 1 | 2 | 2 | 2 | 1 | 2 | 2 |  | 3 |  | 3 |  | 3 |
| n-Butyl-2'-nitro-phenyl sulfide | 25 | 0 | 1 |  | 3 | 2 | 3 | 3 |  |  |  | 3 |  |  | 3 |
| 2-methoxyethyl-2'-nitrophenyl sulfide | 25 | 0 | 1 | 2 | 3 | 3 | 3 | 3 |  |  |  | 3 | 3 |  | 3 |
| Methylthiomethyl-2'-nitrophenyl sulfide | 25 | 2 | 1 | 3 | 3 | 2 | 2 | 3 |  |  |  | 3 | 3 |  | 3 |

The herbicidal activity of the above compounds is surprising for analogous compounds possess little or no dispersing in water for application as a spray for the prevention of weeds. The powdered compositions are made by intimately mixing the listed ingredients, using conventional mixing or blending equipment, and then grinding the mixture to give a powder having an average particle size less than about 50 microns.

A

| | Parts |
|---|---|
| Ethyl-2'-nitrophenyl sulfide | 75 |
| Fuller's earth | 23 |
| Sodium lauryl sulfate, 50% (wetting agent) | 1 |
| Methyl cellulose, 15 c.p.s. (dispersing agent) | 1 |
| | 100 |

B

| | Parts |
|---|---|
| Ethyl-2'-nitrophenyl sulfone | 80 |
| Sodium disulfonate of dibutyl phenylphenol (wetting and dispersing agent) | 2 |
| Bentonite | 18 |
| | 100 |

EXAMPLE V

Water-Dispersible Liquid Compositions

The following compositions are in liquid form and are adapted to give aqueous dispersions for application as sprays. In the case of some of the nitroaryl sulfur compounds, the compositions will be dispersions of solids in the solvent used. The liquid or fluid compositions shown are prepared by thoroughly mixing or dispersing the active compounds and one or more conditioning agents such as dispersing or emulsifying agents, in an organic liquid diluent.

A

| | Parts |
|---|---|
| Ethyl-2'-nitrophenyl sulfide | 52 |
| Heavy aromatic naphtha | 43 |
| Long chain fatty alcohol sulfate (emulsifying agent) | 2 |
| Goulac | 3 |
| | 100 |

B

| | Parts |
|---|---|
| Ethyl-2'-nitrophenyl sulfone | 31 |
| Alkylate aryl polyether alcohol (wetting and emusifying agent) | 3 |
| Methyl cellulose (dispersing agent) | 2 |
| Kerosene | 64 |
| | 100 |

EXAMPLE VI

Granular Compositions

The following compositions are adapted for application by means of a fertilizer spreader apparatus or similar equipment. The compositions are readily prepared by mixing the ingredients with water to form a paste. The paste is then extruded, dried and ground to give the desired granular size. Preferably, the granules will be in the order of one thirty-second to one-quarter inch in diameter.

A

| | Parts |
|---|---|
| Ethyl-2'-nitrophenyl sulfide | 10 |
| Goulac (dispersing agent) | 3 |
| Hydrocarbon oil | 1 |
| Dextrin (binding agent) | 20 |
| Fuller's earth | 66 |
| | 100 |

B

| | Parts |
|---|---|
| Ethyl-2'-nitrophenyl sulfone | 7 |
| Goulac (dispersing agent) | 5 |
| Gelatin (binding agent) | 22 |
| Talc | 66 |
| | 100 |

EXAMPLE VII

Oil-Water Dispersible Powders

The following powdered compositions are adapted for use in the preparation of spray compositions using either oil, water or a combination of oil and water as the liquid diluent. The powders are made by mixing and grinding as in the case of the powders of Example 3.

A

| | Parts |
|---|---|
| Ethyl-2'-nitrophenyl sulfide | 70 |
| Ethylene - oxide - stearate - laurate (emulsifying agent) | 7 |
| Pyrophyllite | 23 |
| | 100 |

B

| | Parts |
|---|---|
| Ethyl-2'-nitrophenyl sulfone | 60 |
| Alkylated aryl polyether alcohol (wetting and dispersing agent) | 10 |
| Fuller's earth | 30 |
| | 100 |

The following compounds are given as further examples of nitroaryl sulfur compounds employed in the compositions and methods of this invention, and it will be understood that such compounds can be used in place of the various compounds specifically shown in the foregoing detailed examples:

Isopropyl-2'-nitrophenyl sulfide
Allyl-4'-nitrophenyl sulfide
n-Butyl-2'-nitrophenyl sulfide
n-Butyl-2'-nitrophenyl sulfone
n-Butyl-2'-nitrophenyl sulfoxide
3-butenyl-2'-nitrophenyl sulfone
Propargyl-2'-nitrophenyl sulfone
3-butynyl-2'-nitrophenyl sulfone
Methallyl-4'-nitrophenyl sulfone
Ethoxyethyl-2'-nitrophenyl sulfoxide
Ethylthioethyl-2'-nitrophenyl sulfoxide
2-chloroethyl-2'-nitrophenyl sulfoxide
Allyl-2'-nitrophenyl sulfoxide
2-bromoallyl-2'-nitrophenyl sulfoxide
Propoxyethyl-2'-nitrophenyl sulfone
Isopropylthiomethyl-2'-nitrophenyl sulfone
4-bromo-2-butenyl-2'-nitrophenyl sulfide
2-chloropropargyl-2'-nitrophenyl sulfide
2-chloropropargyl-2'-nitrophenyl sulfoxide
2-chloropropargyl-2'-nitrophenyl sulfone
t-Butyl-2'-nitrophenyl sulfide
Allyl-4'-nitrophenyl sulfide
Methallyl-3'-bromo-2'-nitrophenyl sulfone
2-bromoallyl-3'-bromo-2'-nitrophenyl sulfide
Propoxypropyl-3',4'-dimethyl-2'-nitrophenyl sulfide
2,2 dichloroallyl-3',4'-diethoxy-2'-nitrophenyl sulfone
Ethyl-4'-ethylmercapto-2'-nitrophenyl sulfide
3-butynyl-4'-methoxy-2'-nitrophenyl sulfone
Ethyl-4'-chloro-2'-nitrophenyl sulfoxide
2-chloropropargyl-4'-ethyl-2'-nitrophenyl sulfide
Methallyl-3',4'-dimethyl-2'-nitrophenyl sulfide
Allyloxyethyl-4'-chloro-2'-nitrophenyl sulfone
Isopropoxypropyl-4'-chloro-2'-nitrophenyl sulfone
Butylthioethyl-4'-chloro-2'-nitrophenyl sulfone While this invention has been described with respect to certain embodiments, it is not so limited, and it is to be understood that variations and modifications thereof obvious to those skilled in the art may be made without departing from the spirit of this invention.

This application is a continuation-in-part of application Serial Number 780,264, filed December 15, 1958, now abandoned.

What is claimed is:

1. A method of controlling undesired plants which comprises applying to the locus to be protected, in an amount sufficient to exert a herbicidal action, a compound of the formula $$(Cl)_x - \underset{NO_2}{\underset{|}{\bigcirc}} - \underset{(O)_n}{\overset{(O)_m}{\underset{\|}{S}}} - R$$

wherein R is an aliphatic radical selected from the group consisting of alkyl, alkenyl, alkynyl, alkoxyalkyl and alkylthioalkyl radicals having up to five carbon atoms in an unbroken chain and $x$, $m$ and $n$ are integers of from 0 to 1, provided that when $m$ and $n$ are 0 then $x$ is 0.

2. A method of inhibiting the germination and growth of undesirable plants, comprising desired and undesired species in the same soil, which comprises applying to the soil a herbicidal amount of a compound of the formula $$(Cl)_y - \underset{NO_2}{\underset{|}{\bigcirc}} - \underset{(O)_y}{\overset{(O)_y}{\underset{\|}{S}}} - R$$

wherein R is an alkyl radical having up to four carbon atoms, and $y$ is an integer of from 0 to 1.

3. A method of claim 2 wherein the compound is ethyl-4'-chloro-2'-nitrophenyl sulfone.

4. A method of inhibiting the germinaton and growth of undesirable plants, comprising desired and undesired species in the same soil, which comprises applying to the soil a herbicidal amount of a compound of the formula $$\underset{NO_2}{\underset{|}{\bigcirc}} - \underset{(O)_y}{\overset{(O)_y}{\underset{\|}{S}}} - R$$

wherein R is an alkyl radical having up to four carbon atoms, and $y$ is an integer of from 0 to 1.

5. A method of claim 4 wherein the compound is ethyl-2'-nitrophenyl sulfone.

6. A method of claim 4 wherein the compound is propyl-2'-nitrophenyl sulfone.

7. A method of inhibiting the germination and growth of undesirable plants, comprising desired and undesired species in the same soil, which comprises applying to the soil a herbicidal amount of a compound of the formula $$\underset{NO_2}{\underset{|}{\bigcirc}} - S - R$$

wherein R is an alkyl radical having up to four carbon atoms.

8. A method of claim 7 wherein the compound is ethyl-2'-nitrophenyl sulfide.

9. A method of claim 7 wherein the compound is methyl-2'-nitrophenyl sulfide.

10. A herbicidal composition comprising a surface active agent and in a herbicidally effective amount a compound having the formula $$(Cl)_x - \underset{NO_2}{\underset{|}{\bigcirc}} - \underset{(O)_n}{\overset{(O)_m}{\underset{\|}{S}}} - R$$

wherein R is an aliphatic radical selected from the group consisting of alkyl, alkenyl, alkynyl, alkoxyalkyl and alkylthioalkyl radicals having up to five carbon atoms in an unbroken chain and $x$, $m$ and $n$ are integers of from 0 to 1, provided that when $m$ and $n$ are 0 then $x$ is 0.

11. A herbicidal composition comprising a surface active agent and in a herbicidally effective amount a compound having the formula $$(Cl)_y - \underset{NO_2}{\underset{|}{\bigcirc}} - \underset{(O)_y}{\overset{(O)_y}{\underset{\|}{S}}} - R$$

wherein R is an alkyl radical having up to four carbon atoms, and $y$ is an integer of from 0 to 1.

12. A composition of claim 11 wherein the compound is ethyl-4'-chloro-2'-nitrophenyl sulfone.

13. A herbicidal composition comprising a surface active agent and in a herbicidally effective amount a compound having the formula $$\underset{NO_2}{\underset{|}{\bigcirc}} - \underset{(O)_y}{\overset{(O)_y}{\underset{\|}{S}}} - R$$

wherein R is an alkyl radical having up to four carbon atoms, and $y$ is an integer of from 0 to 1.

14. A composition of claim 13 wherein the compound is ethyl-2'-nitrophenyl sulfone.

15. A composition of claim 13 wherein the compound is propyl-2'-nitrophenyl sulfone.

16. A herbicidal composition comprising a surface active agent and in a herbicidally effective amount a compound having the formula $$\underset{NO_2}{\underset{|}{\bigcirc}} - S - R$$

wherein R is an alkyl radical having up to four carbon atoms.

17. A composition of claim 16 wherein the compound is ethyl-2'-nitrophenyl sulfide.

18. A composition of claim 16 wherein the compound is methyl-2'-nitrophenyl sulfide.

References Cited in the file of this patent

UNITED STATES PATENTS

| | | |
|---|---|---|
| 1,939,415 | Schimmelschmidt et al. | Dec. 12, 1933 |
| 2,453,983 | Sexton et al. | Nov. 16, 1948 |
| 2,557,520 | Skinner et al. | June 19, 1951 |
| 2,624,662 | Erickson et al. | Jan. 6, 1953 |
| 2,631,935 | Baumgartner | Mar. 17, 1953 |
| 2,654,667 | Goodhue et al. | Oct. 6, 1953 |

OTHER REFERENCES

King, "Insecticides and Repellents," Agricultural Handbook No. 69, May 1954, page 320.

"Plant Regulators," CBCC Positive Data Series, No. 2, June 1955, page 43.

Foster et al. in J. Am. Chem Soc., vol. 46, 1924, pages 1936–1948.